United States Patent
Griswold et al.

[11] Patent Number: 5,433,243
[45] Date of Patent: Jul. 18, 1995

[54] FLUID FLOW CONTROL DEVICE AND METHOD

[75] Inventors: David E. Griswold, Balboa Island; Ali Marandi, Irvine, both of Calif.

[73] Assignee: Griswold Controls, Irvine, Calif.

[21] Appl. No.: 225,713

[22] Filed: Apr. 11, 1994

Related U.S. Application Data

[63] Continuation-in-part of Ser. No. 62,895, May 18, 1993, Pat. No. 5,301,710, which is a continuation-in-part of Ser. No. 911,206, Jul. 9, 1992, Pat. No. 5,230,366, and a continuation-in-part of Ser. No. 35,450, Mar. 23, 1993, abandoned.

[51] Int. Cl.6 .............................. F16K 27/00
[52] U.S. Cl. ..................... 137/498; 137/549
[58] Field of Search ................. 137/549, 498, 613

[56] References Cited

U.S. PATENT DOCUMENTS

| | | |
|---|---|---|
| 1,455,430 | 5/1923 | DeLuiz . |
| 1,697,865 | 1/1929 | Hahn et al. . |
| 1,860,004 | 5/1932 | Yardley . |
| 1,927,582 | 9/1933 | Denk . |
| 3,221,762 | 12/1965 | Chinn .............. 137/549 X |
| 4,207,915 | 6/1980 | Becker et al. ....... 137/549 X |
| 4,541,456 | 9/1985 | Troy . |
| 4,550,896 | 11/1985 | Hansen, III . |
| 4,649,950 | 3/1987 | Bradley et al. . |
| 4,827,974 | 5/1989 | Coulter . |
| 5,076,310 | 12/1991 | Barenberg . |
| 5,088,518 | 2/1992 | Stamatakis et al. . |
| 5,230,366 | 7/1993 | Marandi . |
| 5,301,170 | 4/1994 | Marandi . |

FOREIGN PATENT DOCUMENTS

WO90/01657 2/1990 WIPO .

*Primary Examiner*—John C. Fox
*Attorney, Agent, or Firm*—Lyon & Lyon

[57] ABSTRACT

An automatic fluid flow control device and method are disclosed. The fluid flow control device provides a constant flow rate of strained fluid despite varying differential pressures and employs a combination of a unitary body with a first valve to open or close the device to fluid flow and an integrated, removable strainer in the form of a cup that encircles an inlet of a removable flow control valve. The body is essentially in the shape of a "Y" and provides a compact valve with minimum threaded joints and access to the various components thereof with minimum disassembly. The removable strainer is configured and arranged in a manner so that fluid flows from the outside to the inside of the cup-shaped strainer, allowing easier use and cleaning.

14 Claims, 1 Drawing Sheet

FLUID FLOW CONTROL DEVICE AND METHOD

This application is a continuation-in-part of Application Ser. No. 08/062,895 filed May 18, 1993 entitled Automatic Fluid Flow Device, System, and Method, now U.S. Pat. No. 5,301,710 which is a continuation-in-part of Application Ser. No. 07/911,206 filed Jul. 9, 1992 entitled Automatic Fluid Flow Control Device filed Jul. 9, 1992, which issued as U.S. Pat. No. 5,230,366 on Jul. 27, 1993; and Application Ser. No. 08/035,450 filed Mar. 23, 1993 entitled Automatic Fluid Flow Control and Strainer Device, now abandoned, the disclosures of which are incorporated herein by reference.

FIELD OF THE INVENTION

The present invention relates to fluid flow control devices, particularly automatic fluid flow control devices with integral strainers.

BACKGROUND

Fluid control devices are used to regulate fluid flow so that fluid flowing into such a device will be output at a constant rate. Strainers are often used in conjunction with such devices to filter out unwanted debris. Prior art devices many times comprise multiple components, which result in major drawbacks, namely, increased risk of leakage due to multiple connections, longer installation times, and increased space requirements. In addition, such prior art devices may be difficult to clean due to increased disassembly requirements.

Some prior art devices incorporate a strainer, but the devices generally require disassembly in order to clean the strainer, and debris that collects on the strainer can be difficult to expel.

Another problem with prior art assemblies is that a plumbing system incorporating a prior art assembly is not easily subjected to excessive flow to flush the system without clogging the various components. Certain components of the assembly impede flow through the assembly and, therefore, would impede a high pressure flow therethrough for flushing. Furthermore, the impeding components of the prior art assemblies are not easily removable. Indeed, some prior art assemblies must be taken off-line to remove or replace such components.

SUMMARY OF THE INVENTION

The present invention relates to an automatic fluid flow control device which provides a constant fluid flow even though a variety of pressures are supplied. The novel design and construction of a preferred embodiment of the automatic fluid flow control device according to the present invention provides a singular body which minimizes both (1) the number of threaded joints (thereby minimizing the time it takes to install the device and the risks of leaks in the device), and (2) the size of the device (thereby minimizing the space needed for installation and use).

The automatic fluid flow control device preferably includes, among other things, a ball valve for controlling gross fluid flow through the device, a strainer for straining fluids upon entering the device, and a pressure compensating flow control valve which provides for constant fluid flow through and out of the device. These components are provided in a compact assembly which allows easy access to the strainer and the flow control valve, which may be removed and/or replaced without taking the device off-line. With the strainers and flow control valve removed from the devices in a plumbing system, excessive fluid flow may be provided to the system to flush it. Once flushing is completed, the strainers and flow control valves may be replaced or installed. The device also can include one or more access ports or orifices which enable testing the pressure and/or temperature in the device at various locations. Such access ports or orifices may also provide sufficient access to the components of the device (e.g. strainer and/or flow control valve) to allow removal and/or replacement of those components.

The structure of an exemplary valve according to the present invention is such that when fluid flows into the device, it first encounters a positionable ball valve. The ball valve, depending on its position, either prevents the fluid from entering the rest of the device or allows the fluid to flow into the rest of the device. If the fluid flows into the rest of the device, it preferably then encounters a fluid strainer member.

The strainer is preferably cup-shaped and preferably envelopes an inlet end of the flow control valve. Because of this preferred orientation, debris collects on the outside of the strainer, thereby enabling simpler and more efficient cleaning of the strainer. The strainer filters the fluid thereby preventing contaminants from entering the rest of the device and/or exiting from the device. The fluid strainer member is easily accessible and may be easily removed to allow for cleaning, replacement, and/or flushing. Once the fluid passes through the strainer, it preferably encounters the automatic flow control valve.

The automatic flow control valve preferably is integrated into the same chamber or channel as the strainer, and the inlet portion of the flow control valve is preferably encircled by the strainer assembly. The flow control valve provides for a constant fluid flow rate despite a varying differential pressure. A variety of flow control valves may be used, depending on the flow rate desired. Suitable automatic flow control valve cartridges are available from Griswold Controls, Irvine, Cal., which may be of the type disclosed for example in U.S. Pat. No. 3,752,183. Once the fluid passes through the flow control valve, it exits the device at a selected flow as determined by the cartridge used.

Accordingly, a principal object of this invention is to provide an improved automatic fluid flow control device.

Another object is to provide an automatic fluid flow control and strainer device.

Another object is to provide an automatic fluid flow control device comprising a singular body.

Another object is to provide an automatic fluid flow control and strainer device comprising a singular body.

Another object is to provide an automatic fluid flow control device which is compact.

Another object is to provide an automatic fluid flow control and strainer device which is compact.

Another object is to provide an improved automatic fluid flow control device that is configured to provide easy access to each assembly comprising the device.

Another object is to provide an improved automatic fluid flow control and strainer device that is configured to provide easy access to each assembly comprising the device.

Another object is to provide fluid flow at a selected flow rate regardless of the pressure of the fluid supplied.

Another object is to provide strained fluid flow at a selected flow rate regardless of the pressure of the fluid supplied.

DETAILED DESCRIPTION OF THE PREFERRED EMBODIMENT

Figure 1:
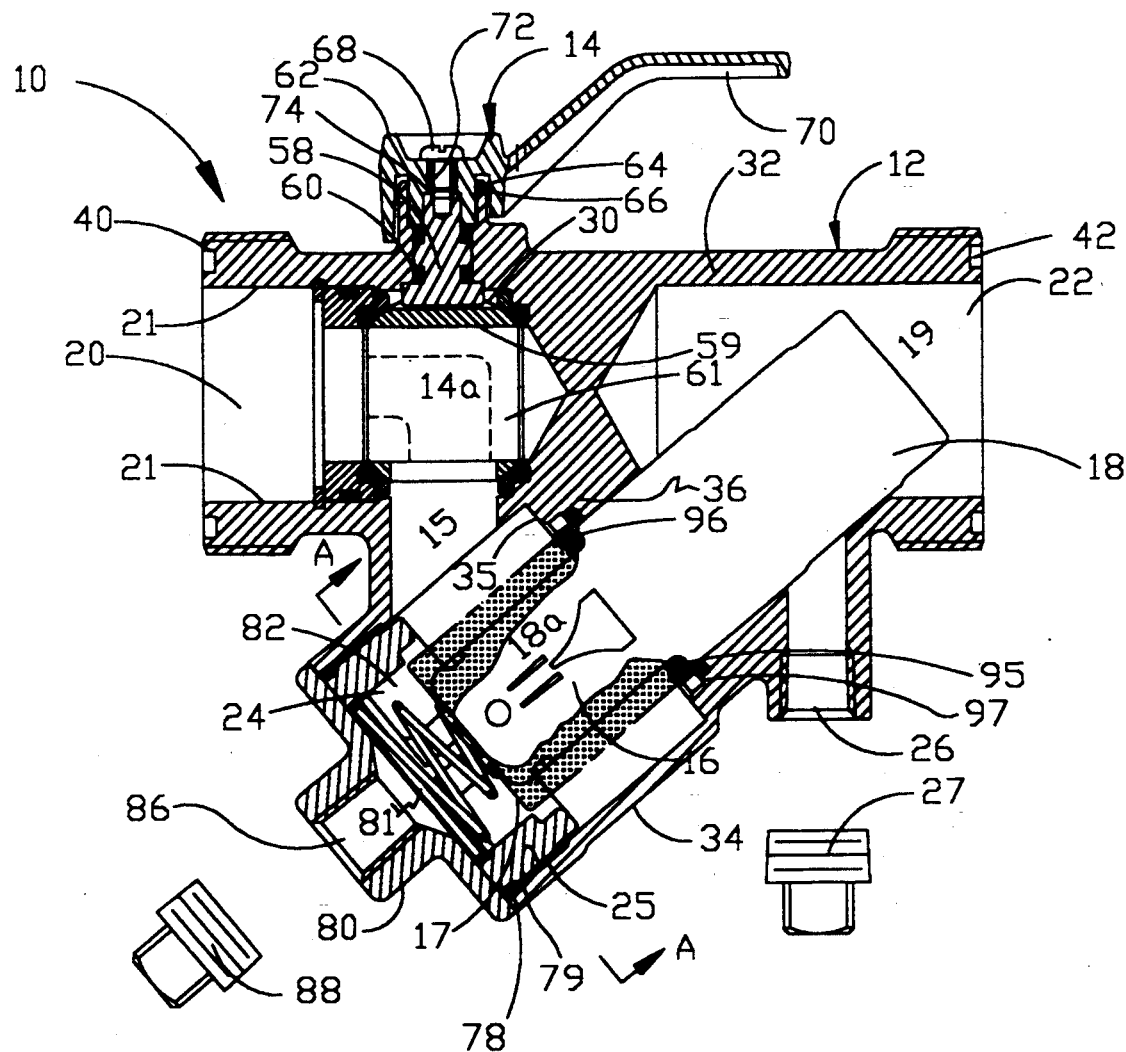
FIG. 1 is a cross-sectional side view of an assembled preferred embodiment of a fluid flow control device of the present invention, where fluid would flow from left to right.

Turning to the drawings, FIG. 1 shows a preferred embodiment of the flow control device of the present invention in the form of an automatic fluid flow control device 10. The device 10 comprises four main components: a valve body 12, a positionable ball valve assembly 14, a removable strainer 16, and a removable flow control valve cartridge 18.

The valve body 12 includes five orifices: an inlet orifice 20, an outlet orifice 22, a flow control valve orifice 24, a test valve orifice 26, and a ball valve fitting orifice 30. As shown in FIG. 1, the valve body 12 also includes: a top side 32, a bottom side 34, a left side 40, and a right side 42.

Furthermore, the valve body 12 comprises several internal channels for directing fluid flow through the device 10. These channels include: an inlet/ball valve channel 14a; a ball valve-to-flow control valve connecting channel 15; a flow control valve channel 18a; and an outlet channel 19. When the device 10 is assembled, the ball valve channel 14a comprises the location of the ball valve assembly 14, and the flow control valve channel 18a comprises the location of the strainer 16 and the flow control valve 18. The valve body 12 is configured generally in a "Y-pattern" configuration, where the inlet orifice 20 and the combined strainer 16 and flow control valve 18 form the upper arms of the "Y" (as shown in FIG. 1, the "Y" is shown on its side with the strainer/flow control valve portion on the bottom), and the outlet channel forms the base of the "Y" (i.e., as viewed from the right in FIG. 1).

A description of the preferred positioning and operation of the device 10 will be helpful in understanding the detailed description of the device 10 given below. The device 10 is connected between two pipes or lines (not shown) with the inlet orifice 20 attached to a pipe or line (not shown) which is to be regulated and the outlet orifice 22 is attached to on outlet pipe (not shown). Operation of the device 10 preferably involves the following six steps:

(1) a fluid flow of varying pressure enters the device 10 through the inlet orifice 20 at the left side 40;
(2) the fluid flow encounters the ball valve assembly 14 which, depending upon its position, either allows the fluid to continue or prevents the fluid from continuing through the device 10;
(3) if the fluid continues through the device 10, it then passes through the ball valve-to-flow control valve connecting channel 15 to the strainer 16;
(4) fluid then flows through the strainer 16 which strains debris;
(5) the strained fluid then passes through the flow control valve 18 which automatically regulates the fluid flow such that the fluid exits the device 10 at a constant, pre-selected rate; and
(6) the strained and regulated fluid flow then passes through the outlet channel 19 and the outlet orifice 22, and exits the device 10.

Thus, the preferred device 10 provides strained and automatically controlled fluid flow from fluid supplied at varying pressures in a very compact and simple apparatus.

Turning to FIG. 1, and particularly the configuration of the valve body 12 in more detail, the inlet orifice 20 and the outlet orifice 22 located on the left 40 and right 42 sides of the valve body 12, respectively, comprise openings in the valve body 12 and respectively define an inlet/ball valve channel 14a and an outlet channel 19 which are aligned on a common axis and oppositely faced. The flow control valve orifice 24 comprises an opening on the bottom 34 of the valve body 12 and defines a flow control valve channel 18a which is acutely angled downward from the common axis toward the inlet orifice 20. The test valve orifice 26 comprises an opening on the bottom side 34 of the valve body 12 which is downwardly angled from the common axis at approximately a ninety degree angle and is located between the flow control valve orifice 24 and the outlet orifice 22. The ball valve fitting orifice 30 comprises an opening on the top side 32 of the valve body 12 which is upwardly angled from the common axis at approximately a ninety degree angle and is located on the ball valve channel 14a between the inlet orifice 20 and the ball valve-to-flow control valve connector channel 15.

Fluid input into the device 10 enters at the inlet orifice 20 from a pipe or line (not shown) which is to be regulated. The inlet orifice 20 of the housing 12 has inner threads 21 for attaching the device 10 to the input line or pipe by conventional methods. Fluid flows through the inlet/ball valve channel 14a, through the ball valve-to-flow control valve connecting channel 15 to the flow control valve channel 18a and encounters the removable strainer 16. The removable strainer 16 and the removable flow control valve 18 are mounted along a common axis. As shown in FIG. 1, the axis of the strainer/flow control valve is angled acutely downward from the axis of the inlet/ball valve channel 14a and the outlet channel 19.

The ball valve assembly 14 comprises a conventional isolation ball valve arrangement assembled in the inlet/ball valve channel 14a of the valve body 12 near the inlet orifice 20. Such ball valve assemblies are well known in the art. A shaft 58 engages the ball valve 59 through the ball valve fitting orifice 30. FIG. 1 shows the ball valve 59 in the open position, with a channel 61 through the ball valve 59 indicated by dashed lines. A washer 60 and a fitting 62 hold the shaft 58 in place. The ball valve fitting orifice 30 has inner threads 64 and the fining 62 has matching outer threads 66 for attaching the fitting 62 to the valve body 12. Furthermore, a screw 68 attaches said fitting 62 and a handle 70 to the shaft 58 thereby enabling manipulation the position of the shaft 58 and thereby manipulation the position of the ball valve 59. The shaft 58 has inner threads 72 and the screw 68 has matching outer threads 74 for attaching the screw 68 (and the handle 70) to the shaft 58. The handle 70 may be integrally molded with the fitting 62, as shown in FIG. 1, or fixedly attached to said fitting 62.

Figure 2:
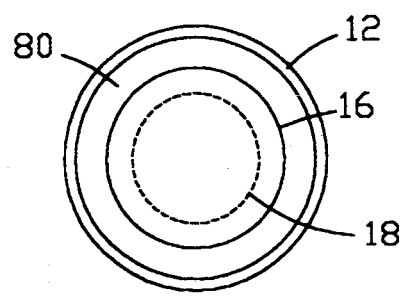
FIG. 2 is an end view of the preferred embodiment of FIG. 1, taken along line A—A in FIG. 1 showing a flow control valve in phantom.

The preferred strainer 16 is generally cup-shaped and cylindrical such that it may encircle an inlet end of the flow control valve 18, which also preferably is generally cylindrical. FIG. 1 shows the outside of a preferred flow control valve cartridge 18 and shows a partial cut-away view of the strainer 16 encircling an inlet end of the flow control valve cartridge 18. FIG. 2 shows that the preferred shape of the strainer 16 and the flow control valve cartridge 18 is generally cylindrical (the flow control valve 18 is shown in phantom through the closed end of the strainer 16). The strainer 16 is held in place without the use of permanent mounting devices, and can be removed simply by removing a threaded cap 80 that covers the flow control valve orifice 24. The strainer 16 preferably has a closed end 17 which is held in place by a spring 81 that is positioned between the strainer end 17 and the threaded cap 80, and is seated in a cavity 82 of the cap 80. The spring 81 biases an open end 96 of the strainer 16 against a flange 35 notched in the body 12 (as further described below). The closed end 17 of the strainer 16 is preferably solid, as shown in FIG. 2, but it may have perforations to allow fluid flow therethrough. The threaded cap 80 is removable, as by unscrewing, to allow removal of the spring 81, strainer 16 and the flow control valve 18. The threaded cap 80 has outer threads 79 that match inner threads 25 of the valve body 12. An O-ring seal 78 removably attached to the cap 80 is preferably used to prevent leakage between the cap 80 and the body 12. Use of the spring 81 allows lesser tolerances in manufacturing the strainer 16, cap 80, and body 12.

The body 12 preferably includes a pair of substantially circular flanges 35 and 36 notched in the flow control channel 18a. The open end 96 of the strainer 16 may slide into the larger diameter flange 35, and a shoulder 97 of the flow control valve 18 may slide into the smaller diameter flange 36. The flow control valve assembly 18 is held in place due to the force exerted by the spring 81 which is transferred through the strainer 16 to force the shoulder 97 of the flow control valve assembly 18 to rest against the smaller flange 36. When fluid pressure is high enough, the pressure itself, rather than the spring, may bias the flow control valve 18 against the smaller flange 36. An O-ring 95 is preferably positioned between the shoulder 97 and the smaller flange 36 to keep fluid and debris from passing through the device 10 without passing through the strainer 16 and flow control valve 18. The strainer assembly 16 is constructed of a porous mesh that allows an appropriate amount of fluid to pass, depending on the type of flow, the amount of debris and the acceptable level of debris allowed in the end use.

The preferred device 10 directs fluid flow such that the flow goes from outside to inside the circumference of the strainer 16 resulting in the collection of debris on the outside surface of the strainer 16, rather than on the inside where the debris can become lodged and more difficult to expel. Often strainer assemblies must be removed in order to expel the debris collected thereon. The configuration and orientation of the present preferred strainer assembly 16, however, allows for easier flushing and cleaning of the strainer element because debris collected thereon can be expelled from the outer surface without removal of the strainer assembly 16 from the device 10.

Once debris is collected on the outside of the strainer assembly 16, it can be expelled out of the device 10 through port 86. This may be accomplished by removing a strainer fitting 88 from the threaded cap 80, thus allowing fluid and debris to wash off the outer surface of the strainer 16 and out of the device 10 through the port 86. If desired, a small ball valve (not shown) may be used in place of the strainer fitting 88 to facilitate back flushing the strainer 16 in this manner. The fitting 88 may screw into the cap 80 or be otherwise attached by means well known in the art.

A variety of flow control cartridges may be used in the removable flow control valve assembly 18 depending on the flow rate desired. Suitable automatic flow control cartridges are available from Griswold Controls, Irvine, Cal., which may be of the type disclosed for example in U.S. Pat. No. 3,752,183.

Once the fluid passes through the flow control valve, it preferably exits the device 10 through the outlet channel 19 and the outlet orifice 22 at a selected flow as determined by the cartridge used.

The preferred embodiment may also include a test valve orifice 26. The preferred test valve orifice 26, as shown in FIG. 1, comprises an opening on the bottom 34 of the valve body 12 which is downwardly angled from the common axis at approximately a ninety degree angle and is located to the right of the removable flow control valve assembly 18. Any conventional closure device can be used to close off test valve orifice 26, including a threaded cap 27 or a plug.

It is preferable as previously noted to include the strainer 16 as part of the overall device 10. However, the device 10 of the present invention can use a flow control valve 18 in the valve body 12 as shown (and without the strainer) and in a channel 18a as shown so that the valve 18 can easily be moved for cleaning or replacement, or for installing a different valve 18 (e.g., one to provide a different flow rate). In such a configuration, the device 10 would include a biasing spring having a diameter larger than spring 81 such that the biasing spring would bias the shoulder 97 of the flow control valve assembly 18 to rest against the smaller flange 36 and thereby prevent fluid flow from exiting the device 10 without first flowing through the flow control valve 18.

The present invention may also be used in a method of plumbing a facility and the resultant plumbing system. The plumbing system preferably comprises a plurality of automatic flow control devices 10 (described in detail above) which contain a flow member to provide strained fluid flow at a selected flow rate regardless of the supplied fluid flow pressure. The flow member comprises a strainer or an automatic flow control cartridge or both. The devices enable easy access to and removal and installation of any flow member of the device. Removal of the flow member(s) enables an excessive fluid flow to be supplied to the system to flush the system without clogging these components.

While embodiments of the present invention have been shown and described, various modifications may be made without departing from the scope of the present invention, and all such modifications and equivalents are intended to be covered.

What is claimed is:

1. A fluid flow control device comprising
a unitary body having a channel,
a first valve assembly contained within the body for opening and closing the device to fluid flow,
a removable flow control valve contained within the channel of the body for receiving fluid flow and automatically controlling fluid flow through the device, and a removable cup-shaped strainer contained within the channel whereby said strainer encircles an end of said flow control valve and strains fluid flow before said fluid flow reaches the removable flow control valve.

2. The device of claim 1 wherein the fluid flows through the strainer from outside the strainer to inside the strainer before the fluid flow encounters the flow control valve.

3. The device of claim 1 further comprising
a cap positioned adjacent the strainer and a spring positioned adjacent the cap for biasing said strainer in place.

4. The device of claim 3 wherein the strainer includes a closed end which is solid.

5. The device of claim 1 wherein the body is substantially in the shape of a "Y."

6. The device of claim 1 wherein said cup-shaped strainer includes a closed end which is solid.

7. The device of claim 1 wherein said cup-shaped strainer includes a closed end which has perforations to allow fluid to flow through said closed end.

8. The device of claim 1 further comprising
an orifice in the body member for providing access for easy removal of the strainer and flow control valve assembly.

9. A fluid flow control device comprising
a unitary body,
a ball valve assembly positioned in the body and for opening and closing the device to fluid flow,
a removable flow control valve assembly positioned in the body and for automatically controlling fluid flow within the device,
a cup-shaped strainer positioned in the body and for straining fluid which flows through the device, said strainer encircling an end of the flow control valve, and said strainer comprising an inside surface and an outside surface, and
the body being configured to direct fluid flow first through the ball valve assembly, then through the strainer from the outside surface to the inside surface, and then through the flow control valve assembly.

10. The device of claim 9 wherein the body is substantially in the shape of a "Y ."

11. A fluid flow control device comprising
a unitary body substantially in the shape of a "Y,"
a ball valve assembly positioned in the body and for opening and closing the device to fluid flow,
a removable flow control valve assembly positioned in the body and for automatically controlling fluid flow within the device,
a cup-shaped strainer positioned in the body and for straining fluid which flows through the device, said strainer encircling an end of the flow control valve, and said strainer comprising an inside surface and an outside surface,
a spring positioned adjacent the strainer for biasing said strainer in place, and
the body being configured to direct fluid flow first through the ball valve assembly, then through the strainer from the outside surface to the inside surface, and then through the flow control valve assembly.

12. A method of cleaning debris off a strainer of a fluid flow control device having a unitary body substantially in the shape of a "Y", said body for housing a ball valve assembly, a flow control valve assembly, and a cup-shaped strainer which encircles an end of the flow control valve assembly, said unitary body being configured to direct fluid flow first through the ball valve assembly, then through the strainer from outside the strainer to inside the strainer, and then through the flow control valve assembly, said unitary body being further configured to include an orifice which allows access to said strainer, said method comprising the steps of
(a) closing the ball valve assembly to stop fluid flow in the device,
(b) opening the orifice,
(c) opening the ball valve assembly and subjecting the device to excessive fluid
flow thereby flushing debris off of the strainer and out the orifice,
(d) closing the ball valve assembly to stop fluid flow in the device,
(e) closing the orifice, and
(f) opening the ball valve assembly to allow fluid flow through the device.

13. A method of plumbing a facility with a plurality of fluid flow control devices, each having a unitary body substantially in the shape of a "Y", said body for housing a ball valve assembly, a flow control valve assembly, and a cup-shaped strainer which encircles an end of the flow control valve assembly, said unitary body being configured to direct fluid flow first through the ball valve assembly, then through the strainer from outside the strainer to inside the strainer, and then through the flow control valve assembly, said method comprising the steps of
(a) installing in a plumbing system a plurality of fluid flow control devices with the strainers and flow control cartridges removed,
(b) providing excessive fluid flow to the plumbing system to flush the plumbing, and
(c) installing the strainers and flow control cartridges into the fluid flow control devices.

14. A method of plumbing a facility with a plurality of fluid flow control devices, each having a unitary body substantially in the shape of a "Y", said body for housing a ball valve assembly, a flow control valve assembly, and a cup-shaped strainer which encircles an end of the flow control valve assembly, said unitary body being configured to direct fluid flow first through the ball valve assembly, then through the strainer from outside the strainer to inside the strainer, and then through the flow control valve assembly, said method comprising the steps of
(a) closing the ball valve assembly to stop fluid flow in the device,
(b) removing the flow control valve assembly and the strainer from the device without taking the device off-line,
(c) opening the ball valve assembly and subjecting the device to excessive fluid flow thereby flushing the device, and
(d) replacing the flow control valve assembly and the strainer.

* * * * *